(12) United States Patent
Absar et al.

(10) Patent No.: US 7,337,025 B1
(45) Date of Patent: Feb. 26, 2008

(54) NEURAL NETWORK BASED METHOD FOR EXPONENT CODING IN A TRANSFORM CODER FOR HIGH QUALITY AUDIO

(75) Inventors: Mohammed Javed Absar, Singapore (SG); Sapna George, Singapore (SG); Antonio Mario Alvarez-Tinoco, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 09/622,147

(22) PCT Filed: Feb. 12, 1998

(86) PCT No.: PCT/SG98/00009

§ 371 (c)(1),
(2), (4) Date: Oct. 30, 2000

(87) PCT Pub. No.: WO99/41844

PCT Pub. Date: Aug. 19, 1999

(51) Int. Cl.
*G06F 17/00* (2006.01)
*G10L 19/00* (2006.01)
*G10L 21/00* (2006.01)

(52) U.S. Cl. ........................ 700/94; 704/500
(58) Field of Classification Search ........... 700/94, 700/200.1, 48; 704/500, 205, 201, 202; 706/16
See application file for complete search history.

(56) References Cited

U.S. PATENT DOCUMENTS

| 5,003,490 A | * | 3/1991 | Castelaz et al. ............... 706/22 |
| 5,222,189 A | | 6/1993 | Fielder ....................... 704/229 |
| 5,715,372 A | * | 2/1998 | Meyers et al. ................ 706/16 |
| 6,151,414 A | * | 11/2000 | Lee et al. ................... 382/253 |

OTHER PUBLICATIONS

ATSC Digital Audio Compression Standard (AC-3) Dec. 20, 1995.*
McKinney, "Digital Audio Compression Standard AC-3," *Advanced Television Systems Committee Standard Document*, Dec. 20, 1996, pp. 1-130.

* cited by examiner

*Primary Examiner*—Sinh Tran
*Assistant Examiner*—Andrew C Flanders
(74) *Attorney, Agent, or Firm*—Lisa K. Jorgenson; E. Russell Tarleton; Seed IP Law Group PLLC

(57) ABSTRACT

A method and apparatus for assigning an exponent coding strategy in a digital audio transform coder. Different coding strategies having different differential coding limits may be assigned to different set of transform exponents according to the frequency domain characteristics of the audio signal. A neural network processing system is utilised to perform an efficient mapping of each exponent set to an appropriate coding strategy.

56 Claims, 4 Drawing Sheets

NEURAL NETWORK BASED METHOD FOR EXPONENT CODING IN A TRANSFORM CODER FOR HIGH QUALITY AUDIO

TECHNICAL FIELD

This invention is applicable in the field of audio coders which employ exponent coding techniques to provide high levels of digital data compression.

BACKGROUND ART

In order to more efficiently broadcast or record audio signals, the amount of information required to represent the audio signals may be reduced. In the case of digital audio signals, the amount of digital information needed to accurately reproduce the original pulse code modulation (PCM) samples may be reduced by applying a digital compression algorithm, resulting in a digitally compressed representation of the original signal. The goal of the digital compression algorithm is to produce a digital representation of an audio signal which, when decoded and reproduced, sounds the same as the original signal, while using a minimum of digital information for the compressed or encoded representation.

Recent advances in audio coding technology have led to high compression ratios while keeping audible degradation in the compressed signal to a minimum. These coders are intended for a variety of applications, including 5.1 channel film soundtracks, HDTV, laser discs and multimedia. Description of one applicable method can be found in the Advanced Television Systems Committee (ATSC) Standard document entitled "Digital Audio Compression (AC-3) Standard", Document A/52, 20 Dec. 1995.

In the basic approach, at the encoder the time domain audio signal is first converted to the frequency domain using a bank of filters. The frequency domain coefficients, thus generated, are converted to fixed point representation. In fixed point syntax, each coefficient is represented as a mantissa and an exponent. The bulk of the compressed bitstream transmitted to the decoder comprises these exponents and mantissas.

The exponents are usually transmitted in their original form. However, each mantissa must be truncated to a fixed or variable number of decimal places. The number of bits to be used for coding each mantissa is obtained from a bit allocation algorithm which may be based on the masking property of the human auditory system. Lower numbers of bits result in higher compression ratios because less space is required to transmit the coefficients. However, this may cause high quantization errors, leading to audible distortion. A good distribution of available bits to each mantissa forms the core of the advanced audio coders.

Further compression is possible by employing differential coding for the exponents. In this case, the exponents for a channel are differentially coded across the frequency range. That is, instead of sending actual values, for many exponents only the difference between adjacent exponent values is sent. Furthermore, instead of coding every exponent a single exponent value is sent for every two exponents. In the extreme case, when exponent sets of several consecutive blocks in a frame are almost identical the exponent set for the first block is only sent, and the remaining blocks in the frame reuse the previously sent values.

These different methods amount to different exponent coding schemes presently in use, and are commonly referred to as exponent strategies.

The differential exponent coding schemes presently in use limit the difference between consecutive exponents to a fixed value which is predefined by the standard. This does not take into consideration the signal characteristic. As a result, sometimes for a fast varying audio spectrum the limit is too low, which results in information loss due to truncation. At other times the limiting value may be too large for a slow varying spectrum, thereby resulting in bit wastage.

A good set of exponent strategies is therefore desirable, together with an efficient processing engine which determines which exponent strategy is most suited for a particular set of exponents. The processing engine should not be too computationally intensive to allow encoders to operate in real time and run on systems having relatively small computational resources.

SUMMARY OF THE INVENTION

In accordance with the present invention, there is provided a method for coding audio data comprising a sequence of exponent sets each comprising a plurality of exponents, comprising the steps of:
  determining a first variation of exponent values between a first exponent set in the sequence and each subsequent exponent set in said sequence;
  selecting an exponent coding strategy for said first exponent set from a plurality of exponent coding strategies on the basis of said first variation; and
  coding said first exponent set according to the selected exponent coding strategy.

Preferably each of the plurality of exponent coding strategies corresponds to a different differential coding limit.

In one form of the invention, the method includes selecting one of said subsequent exponent sets on the basis of said first variation and assigning an exponent re-use coding strategy to the selected exponent set and any exponent sets in said sequence between the first exponent set and the selected exponent set.

Preferably the method includes a step of determining a second variation between consecutive exponents in said first exponent set, wherein the exponent coding strategy for said first exponent set is selected on the basis of said first and second variations.

The step of selecting the exponent coding strategy for the first exponent set is preferably performed using neural network processing. In that case, the neural network processing may include a feature extraction stage in which said sequence of exponent sets is processed to determine said first variation values, a weighted routing stage in which said first variation values are weighted according to predetermined weighting values and routed to inputs of a first neural layer, a selection stage in which an output of the first neural layer is selected, and an output processing stage in which a coding strategy is assigned to said first exponent set based on the output of said selection stage and said second variation.

Preferably the feature extraction stage comprises determining the first variation values according to $$A\mathrm{diff}(E_i, E_j) = (\Sigma_m = e_{i,m} - e_{j,m} =)/n$$

where Adiff is said first variation,
  $E_i$ is said first exponent set and $E_j$ is a subsequent exponent set with j>i,
  $E_i = (e_{i,0}, e_{i,1}, e_{i,2}, \ldots, e_{i,n-1})$,
  $E_j = (e_{j,0}, e_{j,1}, e_{j,2}, \ldots, e_{j,n-1})$,
  n is an integer representing the number of exponents in a said set of exponents, m=0, 1, 2, ..., n−1.

Preferably the processing carried out by the weighted routing stage and first neural layer includes determining $$Y = \begin{bmatrix} y_0 \\ y_1 \\ y_2 \\ \vdots \\ \vdots \\ y_{b-1} \end{bmatrix} = \Gamma \left( \begin{bmatrix} 0 & 0 & 0 & \cdots & \cdots & 0 \\ 0 & w_{1,1} & 0 & \cdots & \cdots & 0 \\ 0 & w_{2,1} & w_{2,2} & \cdots & \cdots & 0 \\ \vdots & \vdots & \vdots & \vdots & \vdots & 0 \\ \vdots & \vdots & \vdots & \vdots & \vdots & 0 \\ 0 & w_{b-1,1} & w_{b-1,2} & \cdots & \cdots & w_{b-1,b-1} \end{bmatrix} \begin{bmatrix} 0 \\ z_1 \\ z_2 \\ \vdots \\ \vdots \\ z_{b-1} \end{bmatrix} - \begin{bmatrix} 0 \\ T_1 \\ T_2 \\ \vdots \\ \vdots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \vdots \\ \vdots \\ \gamma_{b-1} \end{bmatrix} = \begin{bmatrix} f(\gamma_0) \\ f(\gamma_1) \\ f(\gamma_2) \\ \vdots \\ \vdots \\ f(\gamma_{b-1}) \end{bmatrix}$$

where $f(\gamma_i)$ is +1 $\gamma \geq 0$ else it is 0,

Y represents outputs of the first neural layer,

T are threshold values determined during a training phase, w are weighting values determined during the training phase, and b is the number of exponent sets in the sequence comprising said data.

In one form of the invention, the selection stage comprises selecting an output $y_a$ of the first neural layer such that $y_a=1$ and a is maximum for i<a<b. The plurality of exponent coding strategies may comprise strategies $S_1, S_2, \ldots S_c$, where $c \leq b$, corresponding to respective differential coding limits 1, 2, ..., c, wherein the exponent coding strategy $S_\gamma$ assigned to said first exponent set $E_i$ is selected according to $$\gamma = \max[\min(a+1, \sigma(E_i), 1]$$

where $$\sigma(E_i) = \text{floor}((\Sigma_j \|e_{i,j+1} - e_{i,j}\|/n) + 0.5)$$

The exponent sets in the sequence between i+1 and a, inclusive, can then be assigned the exponent re-use coding strategy.

The present invention also provides a method for processing data in an audio data encoder, the data comprising a sequence of exponent sets each comprising a plurality of exponents, comprising the steps of:

determining a first variation of exponent values within a first exponent set;

determining a second variation of exponent values between said first exponent set and each subsequent exponent set in said sequence; and assigning an exponent coding strategy to the first exponent set based on the determined first and second variations.

The invention also provides a digital audio encoder in which audio data is transformed into coefficients having mantissas and exponents arranged in a sequence of sets, having:

a first variation processor coupled to receive the exponents of sets from said sequence and determine a first variation of exponent values between a first set and a plurality of subsequent sets in the sequence;

a second variation processor coupled to receive the exponents of said first set and determine a second variation between consecutive exponent values within said first set; and a neural network processor coupled to receive said first and second variations and select and assign an exponent coding strategy to said first set from a plurality of coding strategies on the basis of said first and second variations.

BRIEF DESCRIPTION OF THE DRAWINGS

The invention is described in greater detail hereinafter, by way of example only, with reference to several embodiments, and having regard to the accompanying drawings, wherein.

DETAILED DESCRIPTION OF THE PREFERRED EMBODIMENTS

Suppose a frame comprises b blocks and a block $B_i$ is composed of an ordered exponent set $E_i$ ($e_{i,0}, e_{i,1}, e_{i,2}, \ldots, e_{i,n-1}$) and mantissa set $M_i$ ($m_{i,0}, m_{i,1}, m_{i,2}, \ldots, m_{i,n-1}$). If the elements in $E_i$ are very similar to those in $E_{i+1}, E_{i+2}, \ldots, E_{i+n}$, then only exponent set $E_i$ needs to be coded into the bitstream. Since the final question is more a matter of perception (the coding must not cause any audible degradation) rather than an exact closed form mathematical equation, a stochastic approach is suitable. Neural Networks are known to solve such problems efficiently with minimum computation requirements.

The maximum difference value allowed between exponents should be based on the variation in the exponents and the number of blocks over which the exponent set is to be reused. Allowing a higher value of maximum allowed difference results in less coding error. If an exponent value is to be reused several times it is necessary to code it with minimal error or else the accumulated error over several blocks could be quite appreciable.

Consider a set of exponent coding strategies $\{S_0, S_1, S_2, \ldots\}$. Let strategy $S_0$ be defined as "reuse". That is, if exponent set $E_i$ = ($e_{i,0}, e_{i,1}, e_{i,2}, \ldots, e_{i,n-1}$) uses strategy $S_0$ for coding then essentially no exponent is transmitted. Instead the receiver is directed to use exponents of $E_{i-1}$ as those of exponent $E_i$. Next, let $S_1$ be defined as an exponent coding strategy where all exponents are differentially encoded with the constraint that the difference between any two consecutive exponents is always −1, +1 or 0. That is, for exponent coding strategy $S_1$, the maximum allowed difference, L, equals +/−1. Similarly, for strategy $S_2$, let the maximum allowed difference, L, be +/−2, and so on for $S_3$, $S_4$, . . . .

The inputs ($E_0, E_1, E_2, \ldots, E_{b-1}$) are presented to the neural network system. The output ($o_0, o_1, o_2, \ldots, o_{b-1}$) of the system is the exponent strategy corresponding to each exponent set.

Figure 1:
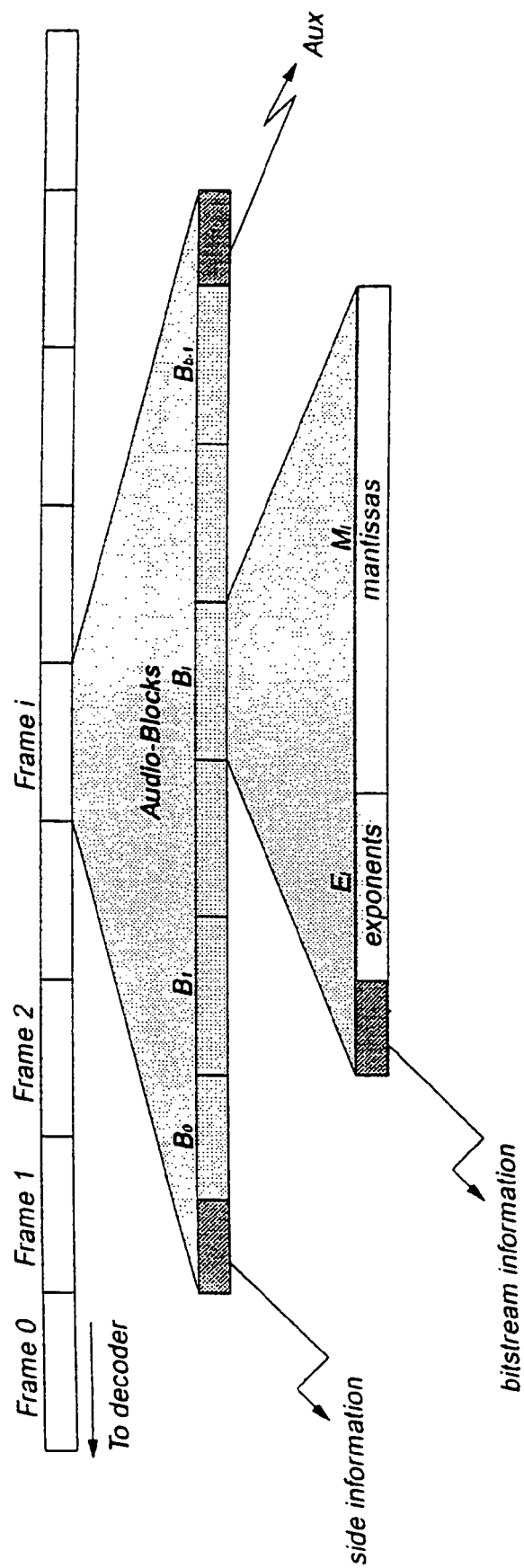
FIG. 1 is a diagrammatic illustration of the data structure of an encoded audio data bit stream, having frames and blocks.

The input to an audio coder comprises a stream of digitized samples of the time domain analog signal, which is illustrated diagrammatically in FIG. 1. The bit stream comprises a sequence of frames, with each frame consisting of b blocks identified as ($B_0$, $B_1$, $B_2$, . . . , $B_{b-1}$). Each block contains n consecutive samples of data. A frame is an independent entity, such that there is no inter-frame data sharing. This facilitates splicing of encoded data at the frame level, and rapid recovery from transmission error. By grouping blocks to form a frame coding efficiently is increased since redundant data is shared, as permitted by signal conditions, across the frame. The block size in a particular coding standard is usually determined based on spectral and temporal resolution requirements for the audio signal.

Figure 2:
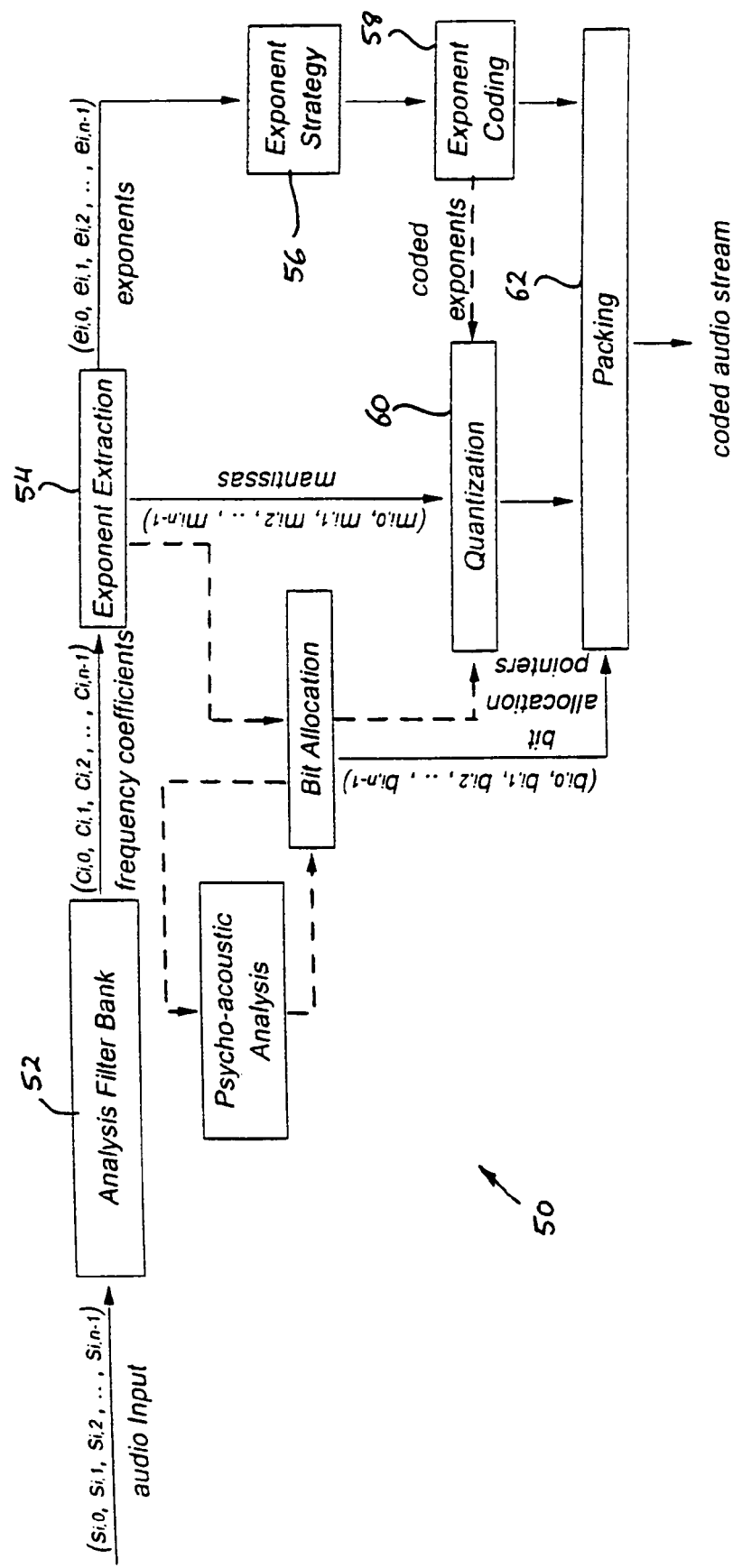
FIG. 2 is a functional block diagram of an audio encoder.

FIG. 2 illustrates a general block diagram of an audio encoder 50. Within any block $B_i$ the n samples form an ordered set ($s_{i,0}$, $s_{i,1}$, $s_{i,2}$, . . . $s_{i,n-1}$). These time domain samples ($s_{i,0}$, $s_{i,1}$, $s_{i,2}$, . . . , $s_{i,n-1}$) are converted to the frequency domain using an analysis filter bank 52. The frequency domain coefficients, thus generated, form another ordered set which can be identified as ($c_{i,0}$, $c_{i,1}$, $c_{i,2}$, . . . , $c_{i,n-1}$). Here $c_{i,0}$ is the lowest frequency (dc) component while $c_{i,n-1}$ is the highest frequency component of the signal.

Audio compression essentially entails finding how much of the information in the set ($c_{i,0}$, $c_{i,1}$, $c_{i,2}$, . . . , $c_{i,n-1}$) is necessary to reproduce the original analog signal at the decoder with minimal audible distortion.

The coefficient set ($c_{i,0}$, $c_{i,1}$, $c_{i,2}$, . . . , $c_{i,n-1}$) is next converted into floating point format, where each coefficient $c_{i,j}$ is represented by an exponent $e_{i,j}$ and mantissa $m_{i,j}$. By definition, $e_{i,j}=floor(log_2(c_{i,j}))$ Also, mantissa $m_{i,j}=(c_{i,j})/e_{i,j}$ The exponents and mantissas form two ordered sets $E_i=(e_{i,0}, e_{i,1}, e_{i,2}, . . . , e_{i,n-1})$ and $M_i=(m_{i,0}, m_{i,1}, m_{i,2}, . . . , m_{i,m-1})$. Therefore, each coefficient $c_{i,j}$ is related to the exponent $e_{i,j}$ and mantissa $m_{i,j}$ by the relation $c_{i,j}=m_{i,j}*2^{ei,j}$.

The exponent set is usually transmitted in its original form. However, the mantissa is truncated to a fixed or variable number of decimal places. Suppose mantissa $m_{i,j}$ is transmitted as $b_{i,j}$ number of bits. The value $b_{i,j}$ is usually obtained from a bit allocation algorithm which for advanced psychoacoustic coders may be based on the masking property of the human auditory system. Low value of $b_{i,j}$ results in higher compression ratio because less space is required to transmit the coefficients. However, this causes very high quantization error leading to audible distortion. A good distribution of available bits to each mantissa forms the core of the most advanced encoders.

Further compression is made possible in audio coders by application of certain coding techniques for exponents. Since most music is characterized by slowly changing spectrum across audio blocks, it is possible to reuse the exponents of a block $B_i$ as exponents of the next few following blocks within the frame. That is, if the elements in exponent set $E_i$ are very similar to the corresponding elements in sets $E_{i+1}$, $E_{i+2}$, . . . , $E_{i+a}$, then only exponent set $E_i$ needs to be coded into the bitstream. A bit can be set to indicate to the decoder to reuse $E_i$ for the next a blocks in the frame. The similarity of set $E_i$ to another set $E_j$ is, in general, a difficult problem to solve.

In addition to reuse, the exponents for a channel are usually differentially coded across the frequency range. That is, instead of sending the actual values, only the difference between the exponents are sent. However, as mentioned, the exponent coding schemes limit the allowable difference between adjacent exponents in the sequence to a fixed value, called L, which is predefined by the standard. This does not take into consideration the actual signal characteristics. As a result, sometimes for fast varying spectrum the limit is too low which results in information loss due to truncation. At other times the limiting value may be too large for a slow varying spectrum, thereby resulting in bit wastage.

Instead of allowing variation in value of L, some existing coders modify the frequency resolution in order to provide varying levels of compression for exponents. For example, instead of sending delta values for every element in set ($e_{i,0}$, $e_{i,1}$, $e_{i,2}$, $e_{i,3}$, $e_{i,4}$, . . . , $e_{i,n-1}$), only delta for every 2 (or 3 or 4 etc.) frequency coefficients are sent. That is, the transmitted set is ($e_{i,0}$, $e_{i,2}$, $e_{i,4}$ . . . , $e_{i,n-1}$). At the receiver the values for $e_{i,1}$, $e_{i,2}$, $e_{i,3}$ are obtained by interpolation of the received values. However, this scheme is essentially a subset of the former scheme of varying the value of L.

To pose the problem more formally, suppose a set of exponent coding strategies is defined as {$S_0$, $S_1$, $S_2$, . . . }. Let strategy $S_0$, be defined as "reuse". That is if exponent set $E_i$ uses strategy $S_0$ for coding then essentially no exponent is transmitted but instead the receiver is directed to use exponents of $E_{i-1}$ as those of exponent $E_i$. Next, let $S_1$ be the exponent coding strategy where all exponents are differentially encoded with the constraint that the difference between any two consecutive exponents is always −1, +1 or 0. That is, for exponent coding strategy $S_1$, the maximum allowed difference L, equals +/−1. Similarly, for strategy $S_2$, let the maximum allowed difference, L, be +/−2, and so on for $S_3$, $S_4$, . . . .

Figure 3:
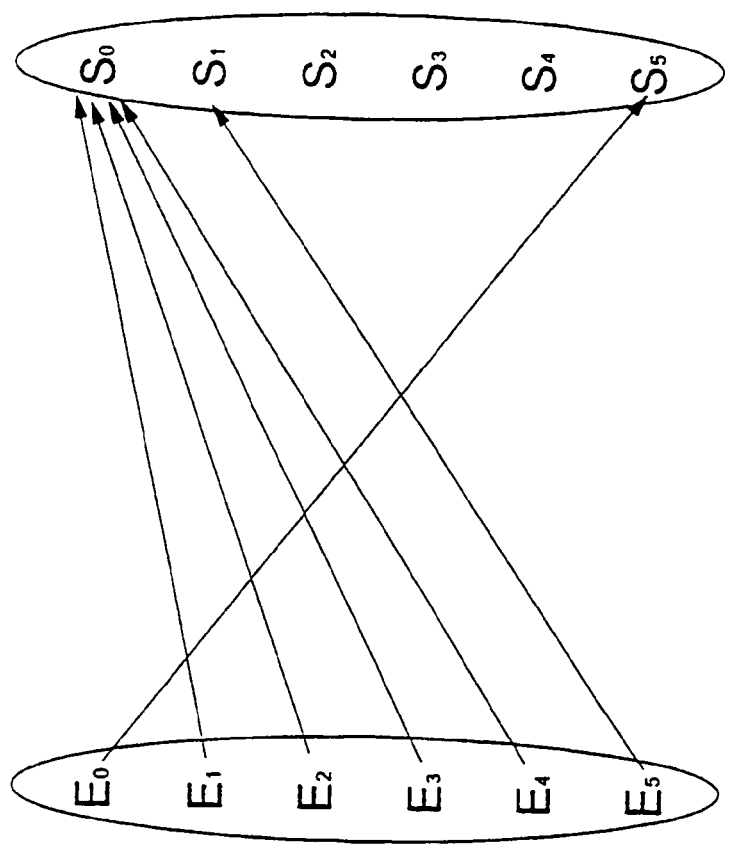
FIG. 3 is a diagrammatic illustration of mapping of exponents sets to coding strategies.

Based on the above discussion, the problem of exponent strategy assignment can be formerly stated as a injective mapping of each exponent set $E_1$ within a frame to a suitable strategy $S_j$ such that maximum compression is achieved with minimal audible distortion. A mapping of exponent sets to coding strategies is illustrated diagrammatically in FIG. 3. Since each frame is an independent entity, exponent set $E_0$ is not allowed to use strategy $S_0$ or else it would attempt to use the exponent information in the previous frame.

For example, suppose a frame consists of six blocks with exponent sets $E_0$, $E_1$, $E_2$, $E_3$, $E_4$ and $E_5$, and the assigned strategy is $S_5$, $S_0$ $S_0$, $S_0$, $S_0$ and $S_1$, respectively. This means exponents in set $E_0$ are differentially encoded with the constraint that the maximum allowed difference is +/−5 (by previous definition of strategy $S_5$). For blocks 1, 2, 3 and 4, no exponent value is sent as they are instructed to reuse the exponents from the previously transmitted set. Block $B_4$'s exponents, that is $E_4$, are transmitted as differentially encoded values with the constraint that the maximum allowed difference is +/−1 (definition of strategy $S_1$).

The optimal mapping is virtually impossible to find due to the complex behavior of the system, large numbers of competing parameters, and the fact that optimality depends on perceived quality of reproduced music rather than on a closed form equation with a minimal value, Moreover, there is a long-standing debate on trade-offs between quality of final music, compression ratio achieved and computational requirements of the system. Therefore, having formally outlined the problem space, a stochastic approach is used to provide the solution. A Neural Network based solution is described herein.

Neural Network System

A neural network's ability to perform computation is based on the effort to reproduce the flexibility and power of the human brain by artificial means. Neural computation is performed by a dense mesh of computing nodes and connections. They operate collectively and simultaneously on most or all data inputs. The basic processing elements of the neural network are called nodes, or simply neurons. They can be considered as threshold units that fire when their total weighted input exceeds certain bias levels. Neurons are often organized in several layers, with neurons in consecutive layers often being connected together. Each connection strength is expressed by a numerical value called weight, the value of which is determined by the specific system which the network attempts to model.

Figure 4:
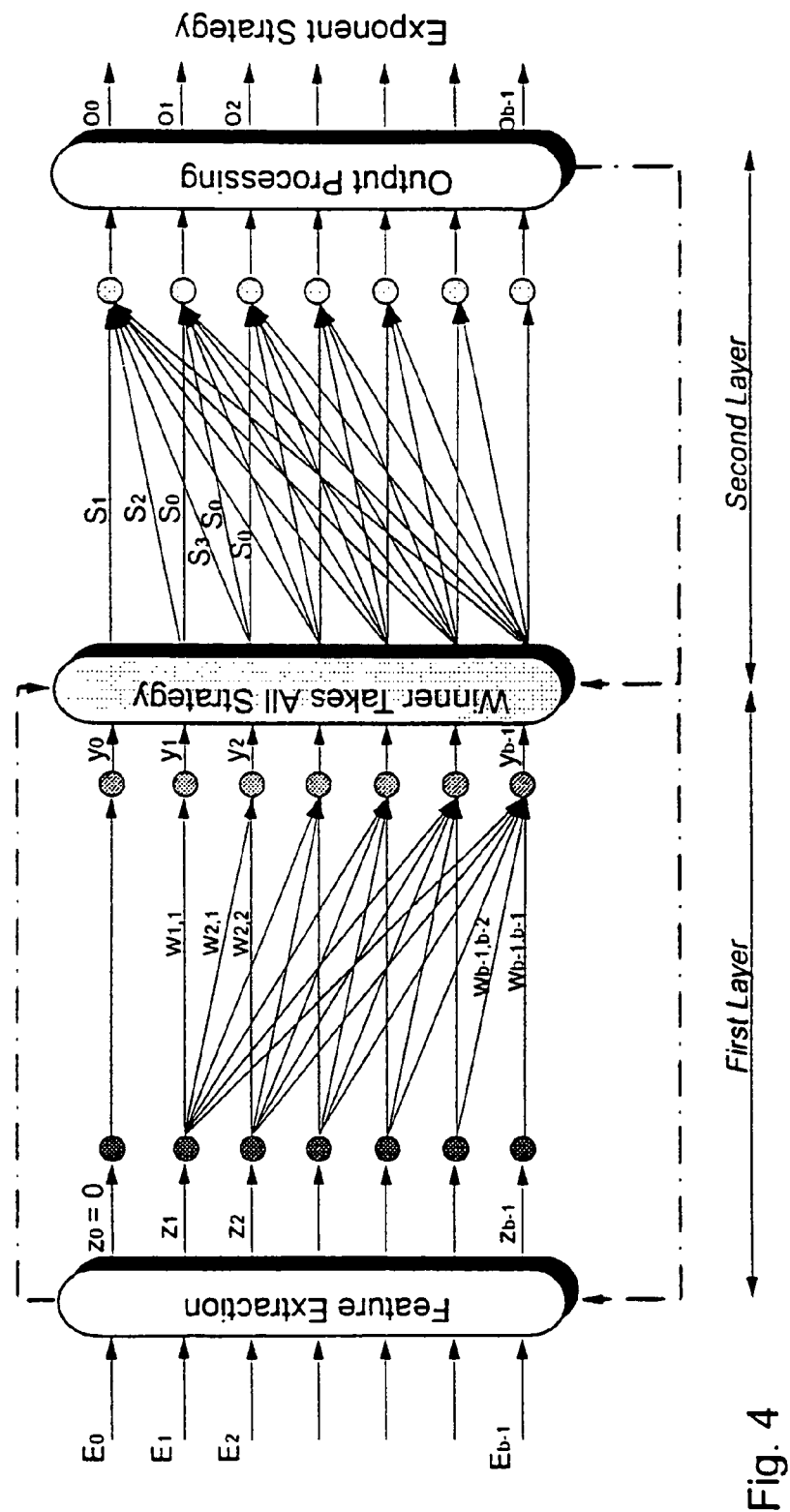
FIG. 4 is a diagrammatic illustration of a neural network system for selection of exponent coding strategies.

FIG. 4 is a diagrammatic illustration of a neural network system for selection of exponent coding strategies. The inputs to the neural network system are the exponent sets $(E_0, E_1, E_2, \ldots, E_{b-1})$, where $E_i = (e_{i,0}, e_{i,1}, e_{i,2}, \ldots e_{i,n-1})$. The output $(o_0, o_1, o_2, \ldots, o_{b-1})$ is the exponent strategy corresponding to each exponent set. Starting from $E_0$ the strategy for each exponent set is determined. Suppose the exponent strategy for $E_1$ is to be determined. The exponent coding strategy for $E_i$ depends on:

1. The number of times $E_i$ will be $E_i$ will be reused across the blocks in the frame. If an exponent value is to be reused several times it is necessary to code it with minimal error or else the accumulated error over several blocks could be quite appreciable.
2. The variation between consecutive elements in the set $E_i$. For a spectrum with large variations across the frequency range the limit L must be high to minimize information loss due to truncation. For a spectrum with low variation a low value of L is adequate and this results in better compression ratio.

A two stage network is used to take both these aspects into consideration when deciding on the strategy for an exponent set. The first criteria is of the number of blocks over which an exponent set is reused. This is dealt with primarily by the first layer. If the elements in $E_i$ are very similar to those in $E_{i+1}, E_{i+2}, \ldots, E_{i+a}$ then only exponent set $E_i$ needs to be coded into the bitstream. A flag can be set to indicate to the decoder to reuse $E_i$ for the next a blocks in the frame.

Feature Extraction

To find the number of blocks over which the same exponent set can be safely used without audible distortion in signal, a measuring function for similarity is required. The correlation coefficient:

$$r(E_i, E_j) = \frac{\sum_m (e_{i,m} - \overline{e_i}) * (e_{j,m} - \overline{e_j})}{\sqrt{\sum_m (e_{i,m} - \overline{e_i})^2 * (e_{j,m} - \overline{e_j})^2}}$$ Eq. 1 is mathematically robust method for computing similarity. But it is too computationally intensive for a practical system. Let $\mathrm{Adiff}(E_i, E_j)$ be a function that determines the similarity between the elements of the set $E_i$ and $E_j$ and returns a value which shows the degree of difference. The similarity function Adiff (mean absolute difference) is defined as:

$$\mathrm{Adiff}(E_i, E_j) = (\Sigma_m = e_{j,m} =)/n$$ Eq. 2

The values $\mathrm{Adiff}(E_i, E_{i+1}), \mathrm{Adiff}(E_i, E_{i+2}), \ldots, \mathrm{Adiff}(E_i, E_{b-1})$ form the input $z_1, z_2, \ldots z_{b-1}$, respectively, to the first stage of neurons. Input $z_0$ is always set to 0, as discussed hereinbelow. Since this step extracts only that characteristic of the input which is instrumental in the decision process of the network, it is termed as feature-extraction.

Reuse Strategy

The first stage of the network determines the maximum number of exponent sets that are considerably similar to a given set $E_i$. The topology of the network and connection weights are such that the neuron $y_1$ fires (corresponding output is 1) if $z_1$ is within acceptable limit. Similarly, $y_2$ fires if both $z_1$ and $z_2$ are within acceptable limits. Since $z_1 = \mathrm{Adiff}(E_i, E_{i+1})$ it implies that if $y_1$ fires then $E_i$ and $E_{i+1}$ are very similar. Similarly, if $y_2$ fires it implies $E_{i+1}$ and $E_{i+2}$ are both very similar to $E_i$. As $z_0$ and the threshold value for $y_0$ are both zero, $y_0$ always fires.

Each neuron in the first layer therefore computes the weighted sum of its input. If the weighted sum is less than or equal to the threshold value, the neuron fires thus making the output 1. If the threshold value is larger than the weighted sum of inputs it means that not all inputs to this neuron are similar to $E_1$ and thus the neuron does not fire. Using matrix notation the output of the first stage of the network is:

$$Y = \begin{bmatrix} y_0 \\ y_1 \\ y_2 \\ \ldots \\ \ldots \\ y_{b-1} \end{bmatrix} =$$ Eq. 3

$$\Gamma\left[\begin{bmatrix} 0 & 0 & 0 & \ldots & \ldots & 0 \\ 0 & w_{1,1} & 0 & \ldots & \ldots & 0 \\ 0 & w_{2,1} & w_{2,2} & \ldots & \ldots & 0 \\ \ldots & \ldots & \ldots & \ldots & \ldots & 0 \\ \ldots & \ldots & \ldots & \ldots & \ldots & 0 \\ 0 & w_{b-1,1} & w_{b-1,2} & \ldots & \ldots & w_{b-1,b-1} \end{bmatrix} \begin{bmatrix} 0 \\ z_1 \\ z_2 \\ \ldots \\ \ldots \\ z_{b-1} \end{bmatrix} - \begin{bmatrix} 0 \\ T_1 \\ T_2 \\ \ldots \\ \ldots \\ T_{b-1} \end{bmatrix}\right]$$

the operator $\Gamma[\bullet]$ is defined as:

$$\Gamma\begin{bmatrix} \gamma_0 \\ \gamma_1 \\ \gamma_2 \\ \ldots \\ \ldots \\ \gamma_{b-1} \end{bmatrix} = \begin{bmatrix} f(\gamma_0) \\ f(\gamma_1) \\ f(\gamma_2) \\ \ldots \\ \ldots \\ f(\gamma_{b-1}) \end{bmatrix}$$ Eq. 4 where $f(\gamma_i)$ is +1 if $\gamma \geq 0$ else it is 0. The weight ($w_{i,j}$) and the threshold ($T_i$) values are determined from the training phase of the neural network.

Perception learning rule is used for training the network. In this form of supervised training, the learning signal is a function of the difference between the desired and the acutal neuron's response. Before the training begins, the weights are usually initialized to small random values (small values are necessary to avoid biased initial state). An input vector is presented to the system and the output is computed. The output from the network is compared with the desired output. The desired output was determined by extensive simulation and listening experiments. If the actual and the desired values are different the weights need to be adjusted to condition the network to imitate the desired behavior. The weights and the threshold are adjusted according to Eq. 5 and Eq. 6, respectively. Here $d_j$ is the desired output. The learning rate, $\alpha = 0.11$, has been experimentally found to be most suited for this application.

$$\Delta w_{j,k} = \alpha \left[ d_j - f\left( \sum_i (w_{i,j} * z_i) - T_j \right) \right] * z_k \qquad \text{Eq. 5}$$

$$\Delta T_j = \alpha \left[ d_j - f\left( \sum_i (w_{i,j} * z_i) - T_j \right) \right] * 0.1 \qquad \text{Eq. 6}$$

In this system, the threshold requires a multiplication by 0.1 for maintaining same rate of adjustments for both thresholds and weights. A good set of training vectors and well adjusted desired output are crucial to the correct setting of the weights.

An example of weights and thresholds of a trained system for a transform coder with six audio blocks is provided below:

$$W = \begin{bmatrix} 0 & 0 & 0 & 0 & 0 & 0 \\ 0 & .05 & 0 & 0 & 0 & 0 \\ 0 & .91 & .23 & 0 & 0 & 0 \\ 0 & 1.2 & .96 & .29 & 0 & 0 \\ 0 & .96 & .92 & .59 & .20 & 0 \\ 0 & 1.2 & 1.0 & .94 & .88 & .28 \end{bmatrix} \quad T = \begin{bmatrix} 0 \\ .02 \\ .33 \\ .71 \\ .75 \\ 1.2 \end{bmatrix}$$

Analyzing the weight matrix W, an interesting behavior becomes apparent. Along and row the weights decrease from left to right. The reason for this is as follows. Consider output $y_2$.

$$y_2 = f(w_{2,1} * z_1 + w_{2,2} * z_2 - T_2) \qquad \text{Eq. 7}$$

$$= f(w_{2,1} * \text{Adiff}(E_i, E_{i+1}) + w_{2,2} * \text{Adiff}(E_i, E_{i+2}) - T_2)$$

If we consider the spectrum of a signal across time, the spectrum shape at time $t_{i+1}$ will be intermediate between spectrum shapes at time $t_i$ and $t_{i+2}$, assuming $\Delta t = t_{i+1} - t_i = t_{i+2} - t_{i+1}$ is small enough. Therefore, if $E_i$ reflects the spectral shape at time $t_i$ and similarly $E_{i+1}$ and $E_{i+2}$ the shape at $t_{i+1}$ and $t_{i+2}$, respectively, then since the spectrum is changing over time, in general $\text{Adiff}(E_i, E_{i+1}) \leq \text{Adiff}(E_i, E_{i+2})$. In Eq. 7, to level this discrepancy the multiplicative weight for $\text{Adiff}(E_i, E_{i+1})$ is larger than that for $\text{Adiff}(E_i, E_{i+2})$.

In effect, the similarity function for estimating similarity of two exponent sets, $\text{Adiff}(E_i, E_j)$, now has a multiplicative factor $\Theta(i,j) = w_{i,j}$. The new similarity function $\Theta(i,j) * \text{Adiff}(E_i, E_j)$, judges similarity of two sets based on not only the mean absolute difference between the elements, but also the time difference expressed as difference in block number, that exists between the two exponents sets.

Two exponents sets closer in time are expected to match much more than two sets with much greater time difference, in order for the similarity function to generate the same value. The fact that the network was able to automatically detect this peculiar characteristic shows its strength and out correctness in modeling of the system. It is to be noted that the system is extremely robust. In an existing system new weight vectors, obtained from perhaps superior training data and training-rule, can always be updated to provide better results.

Winner Takes All Strategy

To the careful reader it is evident that at any one time it is possible that more than one neuron fires. The objective is to determine the maximum number of exponent sets which can be identified as similar to given set $E_i$. In the winner-takes-all strategy, starting from output $y_{b-1}$ and proceeding upward, each neuron is analyzed to find the first one that has fired. Suppose $y_a$ is the first one from the bottom to have fired. Neuron $y_a$ is declared winner and it's output is left as 1. All other neurons in this layer are now switched off. As a result the second layer's output now entirely dependent on neuron $y_a$.

From the network topology and the previous discussions, it is evident that $y_n$ always fires.

This ensures that there is always at least one winner. Now, $y_1$ fires if exponent sets $E_i$ and $E_{i+1}$ are fond by the first layer to be very similar. Similarly, $y_2$ fires if exponents set $E_{i+1}$ and $E_{i+2}$ are both very similar to $E_i$.

In general, $y_a$ fires when $E_{i+1}, E_{i+2}, E_{i+3} \ldots$, and $E_{i+a}$ are all very similar to $E_i$. Therefore, exponent set $E_i$ is only coded and transmitted into the bitstream. Exponent sets $E_{i+1}$, $E_{i+2}, E_{i+3} \ldots$, $E_{i+a}$ all are forced to reuse the values in $E_i$ (that is, all are assigned strategy $S_0$).

The exact strategy for $E_i$ still needs to be determined from the available options $\{S_1, S_2, S_3 \ldots\}$. A simple technique would be to always use a fixed strategy for $E_i$ (e.g. $S_2$) to provide minimal complexity.

A slight improvement on it would be to choose a strategy depending on the number of blocks over which the exponent set $E_i$ would be reused. Note that if $y_a$ is the winner then exactly a+1 blocks are using the same exponent sets. If an exponent value is to be reused several times it is meaningful to code it with minimal error or else the accumulated error over several blocks could be quite appreciable. Therefore one could choose strategy $S_{a+1}$, where $y_a$ is the winner neuron. Thus by this process, if the winner neuron is $y_a$, the strategy for $E_i, E_{i+1}, E_{i+2}, E_{i+3} \ldots$, $E_{i+a}$ is $S_{a+1}, S_0, S_0, S_0, \ldots, S_0$, respectively.

The problem with this improved version is that it does not take the variations of the elements within the exponent set into consideration. A much improved coding strategy for $E_i$ would take into consideration not only the number of reuse blocks but also the variation within $E_i$.

Mean absolute deviation, defined as $\text{Adev}(E_i) = (\Sigma_i \| e_{i,j} \bar{e}_i \|)/n)$ where $\bar{e}_i = \Sigma e_{i,j}/n$, could be used to provide a measure of variation. However, because finally differential coding is to be done, it is much more meaningful to base the strategy on the mean average difference between consecutive exponents, rather than the deviation of exponents from the mean. Consequently, we define mean absolute deviation as:

$$\sigma(E_i) = \text{floor}((\Sigma_j \| e_{i,j+1} \|/n) + 0.5) \qquad \text{Eq. 8}$$

Finally, the exponent coding strategy recommended for $E_i$ is $S_\gamma$, where $\gamma$ is defined by Eq. 9 below:

$$\gamma = \max[\min(a+1, \sigma(E_i)), 1)] \qquad \text{Eq. 9}$$

By this definition, $\gamma$ is always greater or equal 1. This ensures that reuse is never suggested for $E_i$. If variation value $\sigma(E_i)$ is greater than the number of reuse blocks, the value a+1 dictates which strategy is finally chosen. This provides a safety measure by preventing explosion in bit usage for large varying signals with limited reuse. When variation is low, as guided by $\sigma(E_i)$, bit usage is optimized by using only as many bits for the differential limit as required and not being overwhelmed by the large number of reuse blocks.

At the end of this process the strategy for $E_i$, $E_{i+1}$, $E_{i+2}$, $E_{i+3}$, ..., $E_{i+a}$, is $S_y$, $S_0$, $S_0$, $S_0$, ..., $S_0$, respectively. Now strategy for $E_{i+a+1}$, $E_{i+a+2}$, $E_{i+a+3}$, ..., $E_{b-1}$, needs to be determined. Treating $E_{i+a+1}$ as $E_i$ the whole process is repeated.

The deviation values $\Sigma_j \|e_{i,j+1} - e_{i,j}\|/n)$ for some benchmark music streams are given in the tables below. From the statistics it is evident that there is enough variation in frequency domain for commonly occurring music streams to warrant a flexible limit for L in a differential coding scheme. Moreover, from the range of values, it can be concluded that absolute deviation can be effectively used to determine the maximum differential limit, and hence the exponent strategy.

| Castanets | | | | | | |
|---|---|---|---|---|---|---|
| Adev | 3.5 | 2.7 | 3.7 | 2.8 | 3.7 | 2.3 | 2.3 |
| Reuse | 2 | 1 | 3 | 3 | 2 | 4 | 3 |

| Pop | | | | | | |
|---|---|---|---|---|---|---|
| Adev | 1.6 | 2.5 | 1.8 | 2.8 | 2.4 | 1.5 | 1.4 |
| Reuse | 6 | 6 | 6 | 4 | 6 | 6 | 6 |

| Harp | | | | | | |
|---|---|---|---|---|---|---|
| Adev | 4.2 | 3.13 | 3.03 | 2.6 | 2.5 | 2.7 | 0.9 |
| Reuse | 2 | 1 | 4 | 4 | 6 | 3 | 1 |

Note the third and fourth column in the table for castanets. The exponents are reused across three blocks in both cases but the variations are radically different. In the first case a differential limit of 4 is necessary while in the second a limit of 3 should be adequate. This shows that improvement in quality and coding efficiency can be achieved using this technique proposed above.

In summary of the above, referring again to the audio encoder shown in FIG. 2, the frequency domain coefficients which are obtained from the analysis filter bank 52 are split into their constituent mantissas and exponents, and the exponents extracted (54) and passed to and exponent strategy processor 56. The exponent strategy processor 56 embodies the neural network system described hereinabove and illustrated diagrammatically in FIG. 4. The exponent strategy processor 56 receives the extracted exponents and for each operation of the neural network system determines an appropriate coding strategy for at least one of the sets of exponents received. Each subsequent operation of the exponent strategy processor 56 then begins with the next exponent set not yet allocated a strategy. The exponents and assigned strategies are passed then to an exponent coder 58 which differentially codes the exponent sets according to the assigned strategies. The coded exponents are passed to a quantizer 60 when they are quantized together with the corresponding mantissas for packing into the output bitstream. Where an exponent set has been allocated a re-used strategy, quantization is not required, and accordingly a "re-use flag" is passed directly from the exponent coder 58 to the bitstream packer 62.

The foregoing detailed description of the invention has been presented by way of example only, and is not intended to be considered limiting to the invention as defined in the claims appended hereto.

The invention claimed is:

1. A method for coding audio data signal implemented in an audio data encoder having a neural network exponent strategy processor and an exponent encoder, the data including a sequence of exponent sets each comprising a plurality of exponents, the method comprising the steps of:
   receiving the sequence of exponent sets as input to a first neural layer and as input to a second neural layer of the neural network processor;
   determining a first variation of exponent values within a first exponent set;
   determining a second variation of exponent values between said first exponent set and each subsequent exponent set in said sequence, wherein the steps of determining the first and second variations are performed utilizing the neural network processor, the first neural layer computing weighted sums of its inputs to determine the first variation for determining how many times, if any, a coding strategy for the first exponent set is reused, and the second neural layer determining a coding strategy for exponents in the first exponent set;
   assigning an exponent coding strategy to the first exponent set based on the determined first and second variations and transmitting the exponent coding strategy to the exponent encoder; and
   configuring the exponent encoder to encode the first exponent set in the encoder according to the assigned exponent coding strategy.

2. The method of claim 1, wherein the exponent coding strategy is assigned from a plurality of exponent coding strategies having different differential coding limits.

3. The method of claim 2, comprising a step of assigning an exponent coding strategy to at least one subsequent exponent set based on the corresponding determined second variation.

4. The method of claim 3, wherein the plurality of exponent coding strategies includes an exponent set re-use strategy that is assigned to the at least one subsequent exponent set.

5. The method of claim 4, comprising a step of coding said first exponent set and said at least one subsequent exponent set according to the corresponding assigned coding strategies.

6. The method of claim 1, wherein the neural network processor comprises a feature extraction stage in which said sequence of exponent sets is utilized to determine said second variations, a weighted routing stage in which said second variations are weighted according to predetermined weighting values and routed to inputs of the first neural layer, a selection stage in which an output of the first neural layer is selected, and an output processing stage in which a coding strategy is assigned to said first exponent set based on said first variation and the output of said selection stage.

7. The method of claim 6, wherein a coding strategy is assigned to at least one subsequent exponent set on the basis of the output of said selection stage.

8. The method of claim 7, wherein the coding strategy assigned to the at least one subsequent exponent set is an exponent re-use strategy.

9. The method of claim 6, wherein the feature extraction stage comprises determining $$A\text{diff}(E_i, E_j) = (\Sigma_{m=}e_{i,m} - e_{j,m}=)/n$$

where Adiff is said second variation,
$E_i$ is said first exponent set and $E_j$ is a subsequent exponent set with j>i,
$E_i=(e_{i,0}, e_{i,1}, e_{i,2}, \ldots, e_{i,n-1})$,
$E_j=(e_{j,0}, e_{j,1}, e_{j,2}, \ldots, e_{j,n-1})$,
n is an integer representing the number of exponents in a said set of exponents, and
m=0, 1, 2, . . . , n−1.

10. The method of claim 9, wherein the processing carried out by the weighted routing stage and first neural layer includes determining $$Y = \begin{bmatrix} y_0 \\ y_1 \\ y_2 \\ \ldots \\ \ldots \\ y_{b-1} \end{bmatrix} = \Gamma \left( \begin{bmatrix} 0 & 0 & 0 & \ldots & \ldots & 0 \\ 0 & w_{1,1} & 0 & \ldots & \ldots & 0 \\ 0 & w_{2,1} & w_{2,2} & \ldots & \ldots & 0 \\ \ldots & \ldots & \ldots & \ldots & \ldots & 0 \\ \ldots & \ldots & \ldots & \ldots & \ldots & 0 \\ 0 & w_{b-1,1} & w_{b-1,2} & \ldots & \ldots & w_{b-1,b-1} \end{bmatrix} \begin{bmatrix} 0 \\ z_1 \\ z_2 \\ \ldots \\ \ldots \\ z_{b-1} \end{bmatrix} = \begin{bmatrix} 0 \\ T_1 \\ T_2 \\ \ldots \\ \ldots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \ldots \\ \ldots \\ \gamma_{b-1} \end{bmatrix} = \begin{bmatrix} f(\gamma_0) \\ f(\gamma_1) \\ f(\gamma_2) \\ \ldots \\ \ldots \\ f(\gamma_{b-1}) \end{bmatrix}$$

where $f(\gamma_i)$ is +1 if $\gamma \geq 0$ else it is 0,
Y represents outputs of the first neural layer,
T are threshold values determined during a training phase,
w are weighting values determined during the training phase, and
b is the number of exponent sets in the sequence comprising said data.

11. The method of claim 10, wherein the selection stage comprises selecting an output $y_a$ of the first neural layer such that $y_a=1$ and a is maximum for i<a<b.

12. The method of claim 11, wherein the plurality of exponent coding strategies comprises strategies $S_1$, $S_2, \ldots, S_c$, where $c \leq b$, corresponding to differential coding limits 1, 2, . . . , c.

13. The method of claim 12, wherein the exponent coding strategy $S_\gamma$ assigned to said first exponent set $E_i$ is selected according to $\gamma = \max[\min(a+1, \sigma(E_i)), 1]$ where $\sigma(E_i) = \text{floor}\,((\Sigma_j \|e_{i,j+1}\|/n) + 0.5)$.

14. A method implemented in an audio data encoder for coding an audio data signal having a sequence of exponent sets each comprising a plurality of exponents, the method comprising the steps of:
receiving the sequence of exponent sets as input to a first neural layer and as input to a second neural layer of a neural network exponent strategy processor;
determining via neural network processing in the exponent strategy processor a first variation of exponent values between a first exponent set in the sequence and each subsequent exponent set in said sequence to determine the maximum number of exponent sets that are similar to a given exponent set;
selecting via the neural network processing an exponent coding strategy for said first exponent set from a plurality of exponent coding strategies on the basis of said first variation, the first neural layer computing weighted sums of its inputs to determine the first variation for determining how many times the coding strategy for the first exponent set can be reused with other exponent sets, and the second neural layer determining a coding strategy for the first exponent set; and
adapting an exponent encoder according to the determined coding strategy for coding said first exponent set in the exponent encoder according to the determined exponent coding strategy.

15. The method of claim 14, wherein each of the plurality of exponent coding strategies corresponds to a different differential coding limit.

16. The method of claim 14, comprising selecting one of said subsequent exponent sets on the basis of said first variation and assigning an exponent re-use coding strategy to the selected exponent set and any exponent sets in said sequence between the first exponent set and the selected exponent set.

17. The method of claim 14, comprising a step of determining a second variation between consecutive exponents in said first exponent set, wherein the exponent coding strategy for said first exponent set is selected on the basis of said first and second variations.

18. The method of claim 14, wherein the neural network processing performs a feature extraction in which said sequence of exponent sets is processed to determine said first variation values, and further performs a weighted routing in which said first variation values are weighted according to predetermined weighting values and routed to inputs of the first neural layer, and the second neural layer receiving an output of the first neural layer, and output processing in which the coding strategy is assigned to said first exponent set based on the output of said selection stage and said second variation.

19. The method of claim 18, wherein a coding strategy is assigned to at least one subsequent exponent set on the basis of the output of said selection stage.

20. The method of claim 19, wherein the coding strategy assigned to the at least one subsequent exponent set is an exponent re-use strategy.

21. The method of claim 18, wherein the feature extraction stage comprises determining the first variation values according to $\text{Adiff}(E_i, E_j) = (\Sigma_m = e_{i,m} - e_{j,m})/n$ where Adiff is said first variation,
$E_i$ is said first exponent set and $E_j$ is a subsequent exponent set with i>j,
$E_i=(e_{i,0}, e_{i,1}, e_{i,2}, \ldots, e_{i,n-1})$,
$E_j=(e_{j,0}, e_{j,1}, e_{j,2}, \ldots, e_{j,n-1})$,
n is an integer representing the number of exponents in a said set of exponents, and
m=0, 1, 2, . . . , n−1.

22. The method of claim 21, wherein the processing carried out by the weighted routing stage and first neural layer includes determining $$Y = \begin{bmatrix} y_0 \\ y_1 \\ y_2 \\ \ldots \\ \ldots \\ y_{b-1} \end{bmatrix} = \Gamma \left( \begin{bmatrix} 0 & 0 & 0 & \ldots & \ldots & 0 \\ 0 & w_{1,1} & 0 & \ldots & \ldots & 0 \\ 0 & w_{2,1} & w_{2,2} & \ldots & \ldots & 0 \\ \ldots & \ldots & \ldots & \ldots & \ldots & 0 \\ \ldots & \ldots & \ldots & \ldots & \ldots & 0 \\ 0 & w_{b-1,1} & w_{b-1,2} & \ldots & \ldots & w_{b-1,b-1} \end{bmatrix} \begin{bmatrix} 0 \\ z_1 \\ z_2 \\ \ldots \\ \ldots \\ z_{b-1} \end{bmatrix} = \begin{bmatrix} 0 \\ T_1 \\ T_2 \\ \ldots \\ \ldots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \ldots \\ \ldots \\ \gamma_{b-1} \end{bmatrix} = \begin{bmatrix} f(\gamma_0) \\ f(\gamma_1) \\ f(\gamma_2) \\ \ldots \\ \ldots \\ f(\gamma_{b-1}) \end{bmatrix}$$

where $f(\gamma_i)$ is +1 if $\gamma \geq 0$ else it is 0,
Y represents outputs of the first neural layer,
T are threshold values determined during a training phase,
w are weighting values determined during the training phase, and
b is the number of exponent sets in the sequence.

23. The method of claim 22, wherein the selection stage comprises selecting an output $y_a$ of the first neural layer such that $y_a=1$ and a is maximum for $i<a<b$.

24. The method of claim 23, wherein the plurality of exponent coding strategies comprises strategies $S_1, S_2, \ldots S_c$, where $c \leq b$, corresponding to respective differential coding limits $1, 2, \ldots, c$.

25. The method of claim 24, wherein the exponent coding strategy $S_\gamma$ assigned to said first exponent set $E_i$ is selected according to $$\gamma = \max[\min(a+1, \sigma(E_i)), 1]$$

where $$\sigma(E_i) = \text{floor}((\Sigma_j \|e_{i,j+1}\|/n) + 0.5).$$

26. A digital audio encoder in which audio data is transformed into coefficients having mantissas and exponents arranged in a sequence of sets, comprising:
a neural network exponent strategy processor comprising:
a first variation processor coupled to receive the exponents of sets from said sequence and to determine a first variation of exponent values between a first set and a plurality of subsequent sets in the sequence;
a second variation processor coupled to receive the exponents of said first set and determine a second variation between consecutive exponent values within said first set;
the neural network exponent strategy processor configured to select and assign an exponent coding strategy to said first set from a plurality of coding strategies on the basis of said first and second variations and a mean average difference calculation between consecutive exponent values wherein the neural network processor includes a weighted routing stage in which said first variation values are weighted according to a predetermined weighting values and routed to inputs of a first neural layer, a selection stage in which an output of the first neural layer is selected, and an output processing stage in which the coding strategy is assigned to said first exponent set based on the output of said selection stage and said second variation, the first and second neural layers each receiving as input the sets of exponents; and
an exponent encoder adapted to receive the coding strategy from the exponent strategy processor and code the exponents using the coding strategy.

27. The audio encoder of claim 26, wherein each of the plurality of coding strategies correspond to a different differential coding limit.

28. The audio encoder of claim 26, wherein the neural network processor also selects and assigns an exponent coding strategy to at least one of the subsequent sets.

29. The audio encoder of claim 28, wherein the exponent coding strategy assigned to the at least one subsequent sets is an exponent re-use strategy.

30. The audio coder of claim 26, wherein the first variation processor is arranged to determine said first variation according to $$A\text{diff}(E_i, E_j) = (\Sigma_m = e_{i,m} - e_{j,m} =)/n$$

where Adiff is said first variation,
$E_i$ is said first exponent set and $E_j$ is a subsequent exponent set with $i>j$,
$E_i = (e_{i,0}, e_{i,1}, e_{i,2}, \ldots, e_{i,n-1})$,
$E_j = (e_{j,0}, e_{j,1}, e_{j,2}, \ldots, e_{j,n-1})$,
n is an integer representing the number of exponents in a said set of exponents, and
$m = 0, 1, 2, \ldots, n-1$.

31. The audio coder of claim 26, wherein the weighted routing stage of the neural network processor is arranged to determine $$Y = \begin{bmatrix} y_0 \\ y_1 \\ y_2 \\ \ldots \\ \ldots \\ y_{b-1} \end{bmatrix} = \Gamma \left( \begin{bmatrix} 0 & 0 & 0 & \ldots & \ldots & 0 \\ 0 & w_{1,1} & 0 & \ldots & \ldots & 0 \\ 0 & w_{2,1} & w_{2,2} & \ldots & \ldots & 0 \\ \ldots & \ldots & \ldots & \ldots & \ldots & 0 \\ \ldots & \ldots & \ldots & \ldots & \ldots & 0 \\ 0 & w_{b-1,1} & w_{b-1,2} & \ldots & \ldots & w_{b-1,b-1} \end{bmatrix} \begin{bmatrix} 0 \\ z_1 \\ z_2 \\ \ldots \\ \ldots \\ z_{b-1} \end{bmatrix} = \begin{bmatrix} 0 \\ T_1 \\ T_2 \\ \ldots \\ \ldots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \ldots \\ \ldots \\ \gamma_{b-1} \end{bmatrix} = \begin{bmatrix} f(\gamma_0) \\ f(\gamma_1) \\ f(\gamma_2) \\ \ldots \\ \ldots \\ f(\gamma_{b-1}) \end{bmatrix}$$

where $f(\gamma_i)$ is +1 if $\gamma \geq 0$ else it is 0.
Y represents outputs of the first neural layer,
T are threshold values determined during a training phase,
w are weighting values determined during the training phase, and
b is the number of sets in the sequence.

32. The audio encoder of claim 31, wherein the selection stage comprises selecting an output $y_a$ of the first neural layer such that $y_a=1$ and a is maximum for $i<a<b$.

33. The audio encoder of claim 32, wherein the plurality of exponent coding strategies comprises strategies $S_1, S_2, \ldots, S_c$, where $c \leq b$, corresponding to respective differential coding limits $1, 2, \ldots, c$.

34. The audio encoder of claim 33, wherein the exponent coding strategy $S_\gamma$ assigned for encoding exponents in said first set $E_i$ is selected according to $$\gamma = \max[\min(a+1, \sigma(E_i)), 1]$$

where $$\sigma(E_i) = \mathrm{floor}((\Sigma_j |e_{i,j+1}|/n) + 0.5).$$

35. The audio encoder of claim 30, wherein the weighted routing stage of the neural network processor is arranged to determine $$Y = \begin{bmatrix} y_0 \\ y_1 \\ y_2 \\ \ldots \\ \ldots \\ y_{b-1} \end{bmatrix} = \Gamma \left( \begin{bmatrix} 0 & 0 & 0 & \ldots & \ldots & 0 \\ 0 & w_{1,1} & 0 & \ldots & \ldots & 0 \\ 0 & w_{2,1} & w_{2,2} & \ldots & \ldots & 0 \\ \ldots & \ldots & \ldots & \ldots & \ldots & 0 \\ \ldots & \ldots & \ldots & \ldots & \ldots & 0 \\ 0 & w_{b-1,1} & w_{b-1,2} & \ldots & \ldots & w_{b-1,b-1} \end{bmatrix} \begin{bmatrix} 0 \\ z_1 \\ z_2 \\ \ldots \\ \ldots \\ z_{b-1} \end{bmatrix} = \begin{bmatrix} 0 \\ T_1 \\ T_2 \\ \ldots \\ \ldots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \ldots \\ \ldots \\ \gamma_{b-1} \end{bmatrix} = \begin{bmatrix} f(\gamma_0) \\ f(\gamma_1) \\ f(\gamma_2) \\ \ldots \\ \ldots \\ f(\gamma_{b-1}) \end{bmatrix}$$

where $f(\gamma_i)$ is +1 if $\gamma \geq 0$ else it is 0,
Y represents outputs of the first neural layer,
T are threshold values determined during a training phase,
w are weighting values determined during the training phase, and
b is the number of sets in the sequence.

36. The audio encoder of claim 35, wherein the selection stage is arranged to select an output $y_a$ of the first neural layer such that $y_a=1$ and a is maximum for $i<a<b$.

37. The audio encoder of claim 36, wherein the plurality of exponent coding strategies comprises strategies $S_1$, $S_2$, ..., $S_c$, where $c \leq b$, corresponding to respective differential coding limits 1, 2, ..., c.

38. The audio encoder of claim 37, wherein the exponent coding strategy $S_\gamma$ assigned for encoding exponents in said first set $E_i$ is selected according to $$\gamma = \max[\min(a+1 \sigma(E_i)), 1]$$

where $$\sigma(E_i) = \mathrm{floor}((\Sigma_j |e_{i,j+1}|/n) + 0.5).$$

39. A method implemented in an audio data encoder for processing data comprising a sequence of exponent sets, each exponent set including a plurality of exponents, comprising the steps of:
receiving the sequence of exponent sets as input to a first neural layer and as input to a second neural layer of a neural network exponent strategy processor;
determining via neural network processing a first variation of exponent values within a first exponent set;
determining via the neural network processing a second variation of exponent values between said first exponent set and each subsequent exponent set in said sequence; and
assigning via the two-layer neural network exponent strategy processor an exponent coding strategy to the first exponent set based on the determined first and second variations, wherein the exponent coding strategy is assigned from a plurality of exponent coding strategies having different differential coding limits using a mean average difference calculation between consecutive exponent values, the neural network processing having the first and second neural layers with the first neural layer computing weighted sums of its inputs to determine the first variation, and the second neural layer determining a coding strategy, the method further comprising adapting an exponent encoder to encode the audio data in the encoder using the selected exponent coding strategy.

40. The method of claim 39 further comprising coding said first exponent set according to the selected exponent coding strategy from a plurality of coding strategies, wherein each of the plurality of exponent coding strategies corresponds to a different differential coding limit.

41. The method of claim 39, wherein the neural network processor is used to receive the first and second variations and select and assign an exponent coding strategy to the first exponent set from a plurality of coding strategies on the basis of the first and second variations, wherein each of the plurality of coding strategies correspond to a different differential coding limit.

42. A method implemented in an encoder for processing data, the data including a sequence of exponent sets that each include a plurality of exponents, the method comprising the steps of:
receiving the sequence of exponent sets as input to a first neural layer and as input to a second neural layer of a neural network exponent strategy processor;
determining a first variation of exponent values within a first exponent set;
determining a second variation of exponent values between said first exponent set and each subsequent exponent set in said sequence
assigning an exponent coding strategy to the first exponent set based on the determined first and second variations,
wherein the steps of determining the first and second variations are performed utilizing neural network processing, the neural network processing comprising a feature extraction stage in which said sequence of exponent sets is utilized to determine said second variations, a weighted routing stage in which said second variations are weighted according to predetermined weighting values and routed to inputs of the first neural layer, a selection stage in which an output of the first neural layer is selected, and an output processing stage in which a coding strategy is assigned to said first exponent set based on said first variation and the output of said selection stage, the feature extraction stage comprises determining:

$$A\mathrm{diff}(E_i, E_j) = (\Sigma_m = e_{i,m} - e_{j,m} =)/n$$

where Adiff is said second variation,
$E_i$ is said first exponent set and $E_j$ is a subsequent exponent set with $j>i$,
$E_i = (e_{i,0}, e_{i,1}, e_{i,2}, \ldots, e_{i,n-1})$,
$E_j = (e_{j,0}, e_{j,1}, e_{j,2}, \ldots, e_{j,n-1})$,
n is an integer representing the number of exponents in a said set of exponents, and
$m = 0, 1, 2, \ldots, n-1$;

the method further comprising adapting an exponent encoder to encode the audio data using the selected exponent coding strategy.

43. The method of claim 42, wherein the processing carried out by the weighted routing stage and first neural layer includes determining $$Y = \begin{bmatrix} y_0 \\ y_1 \\ y_2 \\ \vdots \\ \vdots \\ y_{b-1} \end{bmatrix} = \Gamma \left( \begin{bmatrix} 0 & 0 & 0 & \cdots & \cdots & 0 \\ 0 & w_{1,1} & 0 & \cdots & \cdots & 0 \\ 0 & w_{2,1} & w_{2,2} & \cdots & \cdots & 0 \\ \vdots & \vdots & \vdots & \cdots & \cdots & 0 \\ \vdots & \vdots & \vdots & \cdots & \cdots & \vdots \\ 0 & w_{b-1,1} & w_{b-1,2} & \cdots & \cdots & w_{b-1,b-1} \end{bmatrix} \begin{bmatrix} 0 \\ z_1 \\ z_2 \\ \vdots \\ \vdots \\ z_{b-1} \end{bmatrix} = \begin{bmatrix} 0 \\ T_1 \\ T_2 \\ \vdots \\ \vdots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \vdots \\ \vdots \\ \gamma_{b-1} \end{bmatrix} = \begin{bmatrix} f(\gamma_0) \\ f(\gamma_1) \\ f(\gamma_2) \\ \vdots \\ \vdots \\ f(\gamma_{b-1}) \end{bmatrix}$$

where $f(\gamma_i)$ is +1 if $\gamma \geq 0$ else it is 0,
Y represents outputs of the first neural layer,
T are threshold values determined during a training phase,
w are weighting values determined during the training phase, and
b is the number of exponent sets in the sequence comprising said data.

44. The method of claim 43, wherein the selection stage comprises selecting an output $y_a$ of the first neural layer such that $y_a=1$ and a is a maximum for i<a<b.

45. The method of claim 44, wherein the plurality of exponent coding strategies comprises strategies $S_1$, $S_2$, ..., $S_c$, where $c \leq b$, corresponding to differential coding limits 1, 2, ..., c.

46. The method of claim 45, wherein the exponent coding strategy $S_\gamma$ assigned to said first exponent set $E_i$ is selected according to $\gamma = \max[\min(a+1, \sigma(E_i)), 1]$ where $\sigma(E_i) = \text{floor}((\Sigma_{j|e i,j+1} - e_{i,j}|/n) + 0.5)$.

47. A method implemented in an encoder for coding audio data having a sequence of exponent sets each comprising a plurality of exponents, the method comprising the steps of:
receiving the sequence of exponent sets as input to a first neural layer and as input to a second neural layer of a neural network exponent strategy encoder;
determining a first variation of exponent values between a first exponent set in the sequence and each subsequent exponent set in said sequence;
selecting an exponent coding strategy for said first exponent set from a plurality of exponent coding strategies on the basis of said first variation; and
coding said first exponent set according to the selected exponent coding strategy,
wherein the step of selecting the exponent coding strategy for the first and second exponent set is performed utilizing neural network processing, the neural network processing comprising a feature extraction stage in which said sequence of exponent sets is processed to determine said first variation values, a weighted routing stage in which said first variation values are weighted according to predetermined weighting values and routed to inputs of the first neural layer, a selection stage in which an output of the first neural layer is selected, and an output processing stage in which a coding strategy is assigned to said first exponent set based on the output of said selection stage and said second variation, wherein the feature extraction stage comprises determining the first variation values according to:

$A\text{diff}(E_i, E_j) = (\Sigma_m = e_{i,m} - e_{j,m} =)/n$ where Adiff is said first variation,
$E_i$ is said first exponent set and $E_j$ is a subsequent exponent set with i>j,
$E_i = (e_{i,0}, e_{i,1}, e_{i,2}, \ldots, e_{i,n-1})$,
$E_j = (e_{j,0}, e_{j,1}, e_{j,2}, \ldots, e_{j,n-1})$,
n is an integer representing the number of exponents in a said set of exponents, and
m = 0, 1, 2, ..., n−1;
the method further comprising adapting an exponent encoder to encode the audio data using the selected exponent coding strategy.

48. The method of claim 47, wherein the processing carried out by the weighted routing stage and first neural layer includes determining $$Y = \begin{bmatrix} y_0 \\ y_1 \\ y_2 \\ \vdots \\ \vdots \\ y_{b-1} \end{bmatrix} = \Gamma \left( \begin{bmatrix} 0 & 0 & 0 & \cdots & \cdots & 0 \\ 0 & w_{1,1} & 0 & \cdots & \cdots & 0 \\ 0 & w_{2,1} & w_{2,2} & \cdots & \cdots & 0 \\ \vdots & \vdots & \vdots & \cdots & \cdots & 0 \\ \vdots & \vdots & \vdots & \cdots & \cdots & \vdots \\ 0 & w_{b-1,1} & w_{b-1,2} & \cdots & \cdots & w_{b-1,b-1} \end{bmatrix} \begin{bmatrix} 0 \\ z_1 \\ z_2 \\ \vdots \\ \vdots \\ z_{b-1} \end{bmatrix} = \begin{bmatrix} 0 \\ T_1 \\ T_2 \\ \vdots \\ \vdots \\ T_{b-1} \end{bmatrix} \right)$$

the operator $\Gamma[\bullet]$ is defined as:

$$\Gamma \begin{bmatrix} \gamma_0 \\ \gamma_1 \\ \gamma_2 \\ \vdots \\ \vdots \\ \gamma_{b-1} \end{bmatrix} = \begin{bmatrix} f(\gamma_0) \\ f(\gamma_1) \\ f(\gamma_2) \\ \vdots \\ \vdots \\ f(\gamma_{b-1}) \end{bmatrix}$$

where $f(\gamma_i)$ is +1 if $\gamma \geq 0$ else it is 0,
Y represents outputs of the first neural layer,
T are threshold values determined during a training phase,
w are weighting values determined during the training phase, and
b is the number of exponent sets in the sequence.

49. The method of claim 48, wherein the selection stage comprises selecting an output $y_a$ of the first neural layer such that $y_a=1$ and a is maximum for i<a<b.

50. The method of claim 49, wherein the plurality of exponent coding strategies comprises strategies $S_1$, $S_2$, ..., $S_c$, where $c \leq b$, corresponding to respective differential coding limits 1, 2, ..., c.

51. The method of claim 50, wherein the exponent coding strategy $S_\gamma$ assigned to said first exponent set $E_i$ is selected according to $\gamma = \max[\min(a+1, \sigma(E_i), 1]$ where $$\sigma(E_i)=\text{floor}((\Sigma_j\|e_{i,j+1}-e_{i,j}\|/n)+0.5).$$

52. A digital audio encoder in which audio data is transformed into coefficients having mantissas and exponents arranged in a sequence of sets, having:
  a neural network exponent strategy processor having:
  a first variation processor coupled to receive the exponents of sets from said sequence and to determine a first variation of exponent values between a first set and a plurality of subsequent sets in the sequence;
  a second variation processor coupled to receive the exponents of said first set and determine a second variation between consecutive exponent values within said first set; and
  a neural network exponent strategy processor having first and second neural layers that each receive the sequence of sets of exponents, the first neural layer adapted to determine the number of times the first set of exponents will be reused across blocks in a frame and the second neural layer using the second variation to select and assign an exponent coding strategy to the first set of exponents from a plurality of coding strategies on the basis of said first and second variations,
  wherein the neural network exponent strategy processor includes a weighted routing stage in which said first variation values are weighted according to predetermined weighting values and routed to inputs of a first neural layer, a selection stage in which an output of the first neural layer is selected, and an output processing stage in which a coding strategy is assigned to said first exponent set based on the output of said selection stage and said second variation, wherein the first variation processor is arranged to determine said first variation according to:

$$A\text{diff}(E_i, E_j)=(\Sigma_m=e_{i,m}-e_{j,m}=)/n$$

where Adiff is said first variation,
$E_i$ is said first exponent set and $E_j$ is a subsequent exponent set with i<j,
$E_i=(e_{i,0}, e_{i,1}, e_{i,2}, \ldots, e_{i,n-1})$,
$E_j=(e_{j,0}, e_{j,1}, e_{j,2}, \ldots, e_{j,n-1})$,
n is an integer representing the number of exponents in a said set of exponents,
m=0, 1, 2, . . . , n−1; and
an exponent encoder that is adapted in response to the assigned coding strategy to encode the audio data with the assigned strategy.

53. The encoder of claim 52, wherein the weighted routing stage of the neural network processor is arranged to determine $$Y = \begin{bmatrix} y_0 \\ y_1 \\ y_2 \\ \ldots \\ \ldots \\ y_{b-1} \end{bmatrix} = \Gamma\left(\begin{bmatrix} 0 & 0 & 0 & \ldots & \ldots & 0 \\ 0 & w_{1,1} & 0 & \ldots & \ldots & 0 \\ 0 & w_{2,1} & w_{2,2} & \ldots & \ldots & 0 \\ \ldots & \ldots & \ldots & \ldots & \ldots & 0 \\ \ldots & \ldots & \ldots & \ldots & \ldots & 0 \\ 0 & w_{b-1,1} & w_{b-1,2} & \ldots & \ldots & w_{b-1,b-1} \end{bmatrix}\begin{bmatrix} 0 \\ z_1 \\ z_2 \\ \ldots \\ \ldots \\ z_{b-1} \end{bmatrix} = \begin{bmatrix} 0 \\ T_1 \\ T_2 \\ \ldots \\ \ldots \\ T_{b-1} \end{bmatrix}\right)$$

the operator $\Gamma[\bullet]$ is defined as:

$$\Gamma\begin{bmatrix} \gamma_0 \\ \gamma_1 \\ \gamma_2 \\ \ldots \\ \ldots \\ \gamma_{b-1} \end{bmatrix} = \begin{bmatrix} f(\gamma_0) \\ f(\gamma_1) \\ f(\gamma_2) \\ \ldots \\ \ldots \\ f(\gamma_{b-1}) \end{bmatrix}$$

where $f(\gamma_i)$ is +1 if y≧0 else it is 0,
Y represents outputs of the first neural layer,
T are threshold values determined during a training phase,
w are weighting values determine during the training phase, and
b is the number of sets in the sequence.

54. The encoder of claim 53, wherein the selection stage comprises selecting an output $y_a$ of the first neural layer such that $y_a=1$ and a is maximum for i<a<b.

55. The encoder of claim 54, wherein the plurality of exponent coding strategies comprises strategies $S_1$, $S_2$, . . . , $S_c$, where c≦b, corresponding to respective differential coding limits 1, 2, . . ., c.

56. The encoder of claim 55, wherein the exponent coding strategy $S_\gamma$ assigned for encoding exponents in said first set $E_i$ is selected according to $$\gamma=\max[\min(a+1,\sigma(E_i)),1]$$

where $$\sigma(E_i)=\text{floor}((\Sigma_j\|e_{i,j+1}-e_{i,j}\|/n)+0.5).$$

* * * * *

UNITED STATES PATENT AND TRADEMARK OFFICE
CERTIFICATE OF CORRECTION

PATENT NO.       : 7,337,025 B1
APPLICATION NO.  : 09/622147
DATED            : February 26, 2008
INVENTOR(S)      : Mohammed Javed Absar et al.

It is certified that error appears in the above-identified patent and that said Letters Patent is hereby corrected as shown below:

Column 12
Line 67, "Adiff(Ei, Ej) = ($\Sigma_m$ = = $e_{i,m}$ - $e_{j,m}$= =)/n)" should read as -- Adiff(Ei, Ej) = ($\Sigma_m$ | $e_{i,m}$ - $e_{j,m}$|)/n) --

Column 13
Line 54, "$\sigma(E_i)$ = floor(($\Sigma_j$||$e_{i,j+1}$||/n)+0.5)" should read as -- $\sigma(E_i)$ = floor(($\Sigma_j$||$e_{i,j+1}$-$e_{i,j}$||/n)+0.5) --

Column 14
Line 54, "Adiff(Ei, Ej) = ($\Sigma_m$ = = $e_{i,m}$ - $e_{j,m}$ = =)/n)" should read as -- Adiff(Ei, Ej) = ($\Sigma_m$ | $e_{i,m}$ - $e_{j,m}$ |)/n) --

Column 15
Line 42, "$\sigma(E_i)$ = floor(($\Sigma_j$||$e_{i,j+1}$||/n)+0.5)" should read as -- $\sigma(E_i)$ = floor(($\Sigma_j$||$e_{i,j+1}$-$e_{i,j}$||/n)+0.5) --

Column 16
Line 20, "Adiff(Ei, Ej) = ($\Sigma_m$ = = $e_{i,m}$ - $e_{j,m}$ = =)/n)" should read as -- Adiff(Ei, Ej) = ($\Sigma_m$ | $e_{i,m}$ - $e_{j,m}$ |)/n) --

Column 17
Line 7, "$\sigma(E_i)$ = floor(($\Sigma_j$||$e_{i,j+1}$||/n)+0.5)" should read as -- $\sigma(E_i)$ = floor(($\Sigma_j$||$e_{i,j+1}$-$e_{i,j}$||/n)+0.5) --
Line 54, "$\sigma(E_i)$ = floor(($\Sigma_j$||$e_{i,j+1}$||/n)+0.5)" should read as -- $\sigma(E_i)$ = floor(($\Sigma_j$||$e_{i,j+1}$-$e_{i,j}$||/n)+0.5) --

Column 18
Line 40, "exponent set in said sequence" should read as -- exponent set in said sequence; --
Line 43, "first and second variations," should read as -- first and second variations; --
Line 58, "Adiff(Ei, Ej) = ($\Sigma_m$ = = $e_{i,m}$ - $e_{j,m}$ = =)/n)" should read as -- Adiff(Ei, Ej) = ($\Sigma_m$ | $e_{i,m}$ - $e_{j,m}$ |)/n) --

Column 19
Line 13, "Adiff(Ei, Ej) = ($\Sigma_m$ = = $e_{i,m}$ - $e_{j,m}$ = =)/n)" should read as -- Adiff(Ei, Ej) = ($\Sigma_m$ | $e_{i,m}$ - $e_{j,m}$ |)/n) --

UNITED STATES PATENT AND TRADEMARK OFFICE
CERTIFICATE OF CORRECTION

PATENT NO. : 7,337,025 B1
APPLICATION NO. : 09/622147
DATED : February 26, 2008
INVENTOR(S) : Mohammed Javed Absar et al.

It is certified that error appears in the above-identified patent and that said Letters Patent is hereby corrected as shown below:

Column 21
Line 3, "$\sigma(E_i) = \text{floor}((\Sigma_j \|e_{i,j+1}\|/n)+0.5)$" should read as -- $\sigma(E_i) = \text{floor}((\Sigma_j \|e_{i,j+1}-e_{i,j}\|/n)+0.5)$ --
Line 37, "$\text{Adiff}(E_i, E_j) = (\Sigma_m == e_{i,m} - e_{j,m} ==)/n)$" should read as -- $\text{Adiff}(E_i, E_j) = (\Sigma_m | e_{i,m} - e_{j,m} |)/n)$ --
Line 46, "an exponent encoder that is adapted" should read as -- further comprising an exponent encoder that is adapted --

Column 22
Line 28, "w are weighting values to be determine" should read as -- w are weighting values to be determined --

Signed and Sealed this

Eighth Day of July, 2008

JON W. DUDAS
*Director of the United States Patent and Trademark Office*